Figure 1:
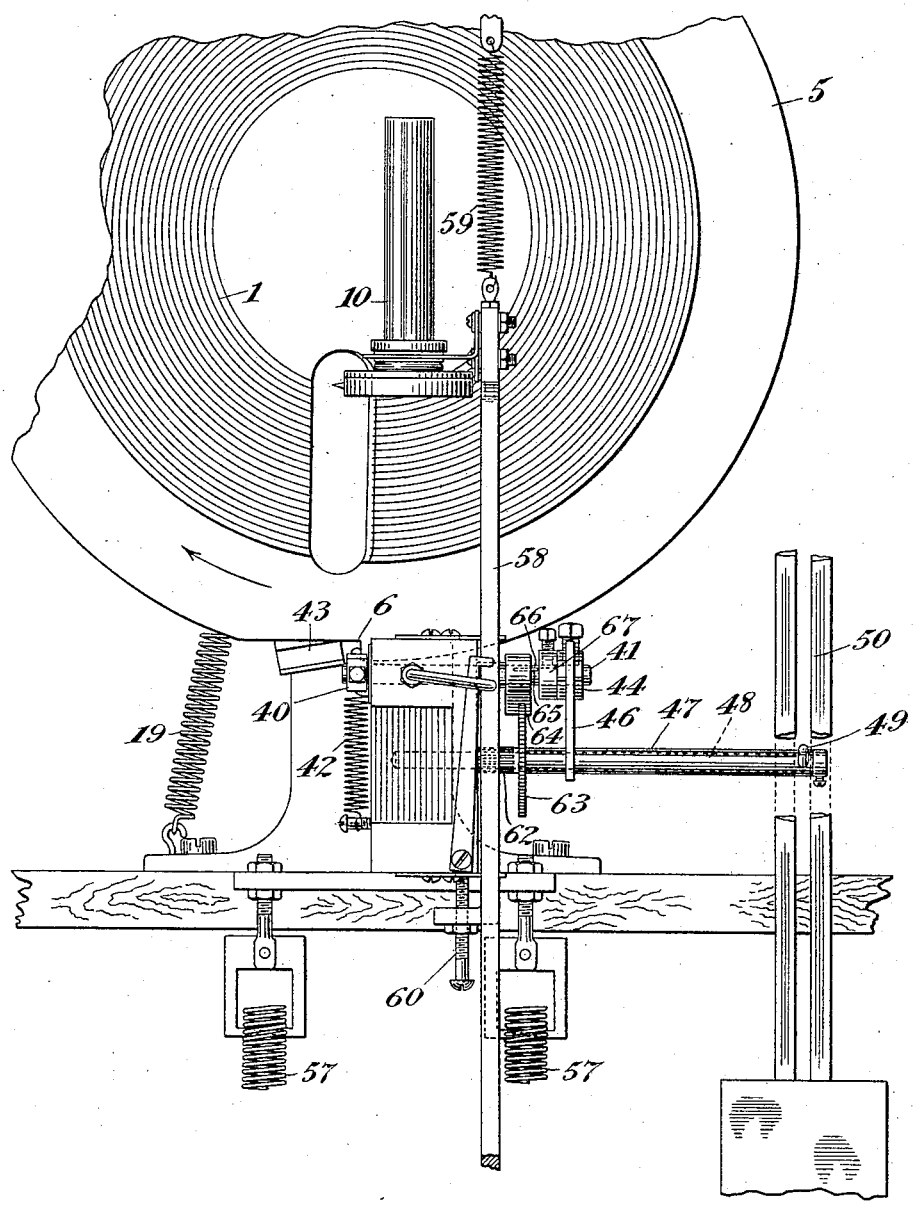

No. 764,748. PATENTED JULY 12, 1904.
G. A. MOORE.
ANNOUNCING MACHINE.
APPLICATION FILED AUG. 19, 1903.
NO MODEL. 2 SHEETS—SHEET 1.

Witnesses:
Martin Roberts
Lucius Varney

Inventor:
George A. Moore
By Redding, Kiddle & Greeley
Attys.

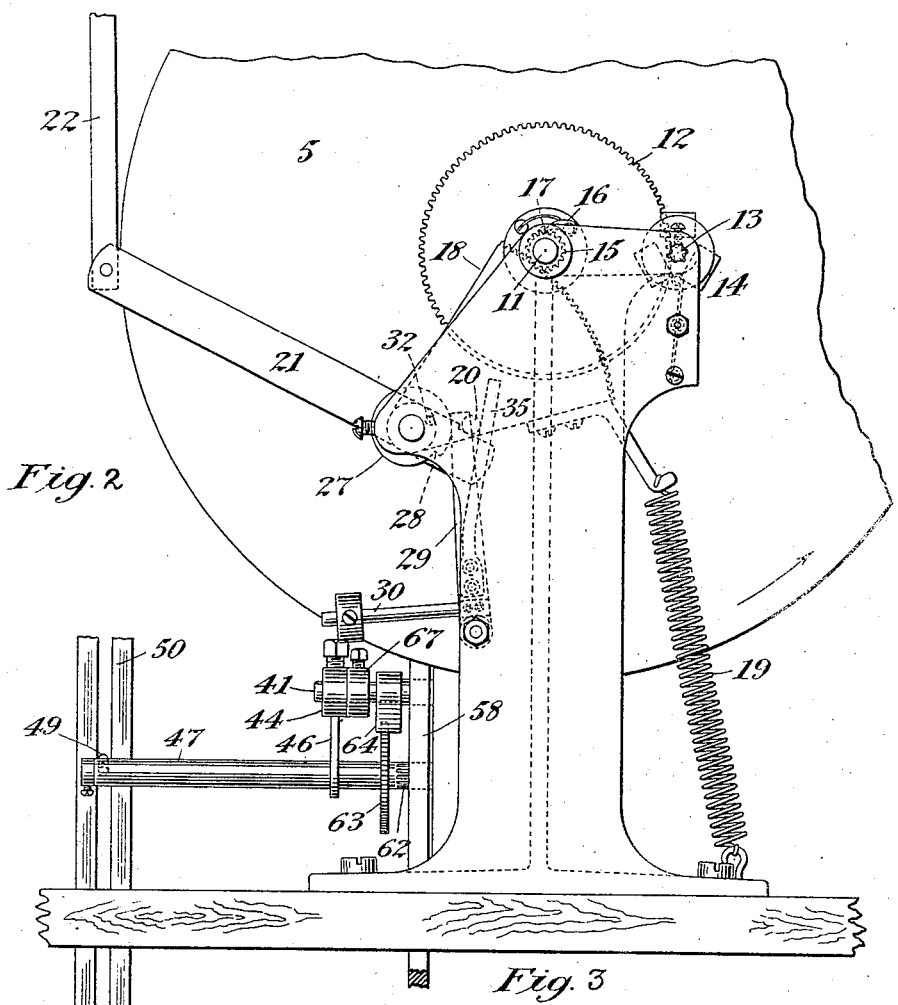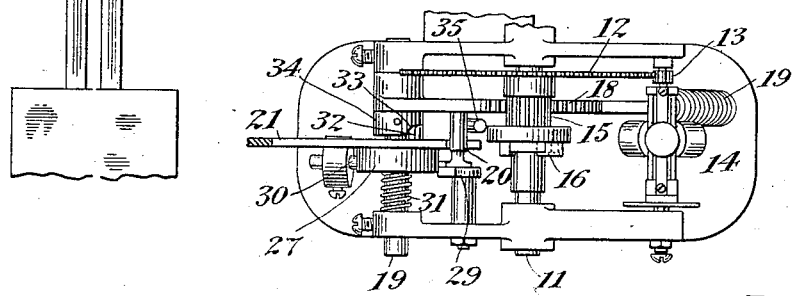

No. 764,748.

Patented July 12, 1904.

UNITED STATES PATENT OFFICE.

GEORGE ALBERT MOORE, OF NEW YORK, N. Y., ASSIGNOR TO AMERICAN TALKING SCALE COMPANY, OF AUGUSTA, MAINE, A CORPORATION OF MAINE.

ANNOUNCING-MACHINE.

SPECIFICATION forming part of Letters Patent No. 764,748, dated July 12, 1904.

Application filed August 19, 1903. Serial No. 169,983. (No model.)

*To all whom it may concern:*

Be it known that I, GEORGE ALBERT MOORE, a citizen of the United States, residing in the borough of Manhattan, in the city of New York, in the State of New York, have invented certain new and useful Improvements in Announcing-Machines, of which the following is a specification, reference being had to the accompanying drawings, forming a part hereof.

This invention relates to machines of the general character of that shown in Letters Patent of the United States No. 718,500, dated January 13, 1903, in which some one of a previously-prepared series of announcements is expressed through the operation of suitable mechanism, which may be actuated by the weight or height of a person or other means and may be rendered operative, if desired, by a coin-controlled device.

The object of the present invention is to simplify and improve in various particulars the construction and operation of machines of the character referred to, as more particularly explained hereinafter with reference to the accompanying drawings, in which, for the purposes of such explanation, a convenient and practical embodiment of the invention is illustrated.

In said drawings, Figures 1 and 2 are views in front elevation and rear elevation, respectively, showing those portions of the mechanism of a phonographic weight-announcing or weighing machine in which the invention is more particularly concerned. Fig. 3 is a plan view of some of the parts shown in Fig. 2.

In the embodiment of the invention illustrated in the drawings the machine is adapted to give audible expression to a weight imposed upon a scale-platform, as the weight of an individual who may stand thereon, a previously-prepared phonographic record, having impressed thereon a series of weight announcements being arranged to be brought into operative relation with a sound-reproducer, while the selection of the particular weight-announcement with which the reproducer is brought into operative relation is determined by relative movement of the record and the reproducer under the influence of the weight on the scale-platform, and provision is made whereby the machine, normally locked against operation, shall be brought into operation through the action of a coin-controlled device. In this machine the phonographic record 1, supported upon a plate 5, and the phonographic sounder or reproducer 10 may be arranged and operate as shown and described in said Letters Patent No. 718,500. The record-plate 5 is fixed upon a shaft 11, which is mounted in suitable bearings supported by the frame of the machine, said shaft also bearing a gear 12 for engagement with a pinion 13 of a suitable governor 14, which may be constructed as shown in Letters Patent of the United States No. 702,985, dated June 24, 1902. Loosely mounted on the shaft 11 is a pinion 15, which carries a spring-pressed pawl 16, adapted to engage a notch 17 in the shaft 11, whereby the pinion 15 rotates the record-plate with it when moving in one direction and moves idly on the shaft in the opposite direction. The pinion 15 is engaged by a segment 18, which is moved in one direction by hand-operated devices and is returned in the opposite direction to impart rotation to the record-plate by suitable means, such as a spring 19. The gear-segment 18 is mounted loosely upon a fixed shaft 19 and carries a pin 20, which is engaged by a lever 21, also mounted on the shaft 19 and arranged to be operated by hand, being connected in the machine represented by a link 22 with a suitable handpiece. The link 22 is held normally in its elevated position by suitable means, such as a spring. (Not shown.) It will be understood that when the handpiece is depressed the gear-segment 18 is swung upon its bearing through the contact of the pin 20 with the end of the lever 21, the pawl 16, which is carried by the pinion 15, then moving idly over the notch 17 in the shaft 11; but when the segment is released by the spring 19 the pawl then engages the notch or shoulder on the shaft 11 and the record-plate receives a complete rotation. To insure complete movement of the handpiece, the hub 27 of the lever 21 is provided with a notch 28, (shown in dotted lines in Fig. 6,) which is adapted to be engaged when the lever has been moved the required distance by a latch 29, which may be pressed normally toward the hub 17 by a suitable counterweighted arm 30. The arm 21 and its hub 27 are movable longitudinally upon the fixed shaft 19 against a suitable spring 31, and the hub or the lever carries a projecting stud 32, which coöperates with a cam 33, formed on a collar 34, fixed to the shaft 19 to thrust the lever 21 away from the collar 34 as the lever approaches the limit of its proper movement, and thereby to disengage the lever from the pin 20 of the segment 18. This device not only permits the segment to be returned at the proper time independently of the movement of the handpiece, but prevents excessive movement of the segment and breaking of the teeth of the segment or of the parts connected therewith by reason of violent movement of the handpiece. The lever 21 is held in its abnormal position by the latch 29, as described, until the segment 18 is released and returns to its normal position, when the pin 20, carried thereby, makes contact with a finger-piece 35, secured to the latch 29, and throws the latch out of engagement with the notch 28 of the hub 27, permitting the lever and its connected parts to be returned to normal position by the spring 26.

The record-plate 5 is held until the proper time against rotation by the spring 19 by the engagement with a notch 6 in its edge of a detent 40, which is fixed upon a shaft 41, mounted in a suitable bearing carried by the frame of the machine, and is held normally away from engagement with the record-plate by a suitable spring 42. A lifter-cam 43, carried by the record-plate 5, picks up the detent 40 as the record-plate completes its rotation and brings it into engagement again with the notch or shoulder 6, where it is held by devices about to be described. On the shaft 41 is adjustably secured a collar 44, having a notch or shoulder 45 for engagement by a spring-pressed latch 46, secured to a sleeve 47, mounted loosely on a fixed spindle 48, carried by the frame of the machine. The sleeve 47 is also provided with a finger 49, which is projected into the coin-chute 50, so that when a coin falls through the chute and strikes the finger 49 the latch 46 will be disengaged from the shoulder 45 of the collar 44, and the shaft 41 will be permitted to turn under the influence of the spring 42, and the detent 40 will thereby be disengaged from the record-plate 5 and the latter permitted to make one rotation under the influence of the spring 19.

In the machine shown in the accompanying drawings, as in that shown in the above-mentioned Letters Patent of the United States No. 702,985, the reproducer 10 is movable with respect to the record 1 and is connected with the scale-platform through a link drawn normally upward by counterbalancing-springs 57 and an adjustable rod or bar 58, which is suitably guided in the frame of the machine and may be counterbalanced by a spring 59, having an adjustable stop 60 to limit its upward movement. As described in said Letters Patent No. 702,985, the rod or bar 58 may be provided with rack-teeth to be engaged by a pinion, which is mounted loosely on the fixed spindle 48 and has secured thereto a ratchet-wheel 63. The latter is engaged by a pawl 64, mounted loosely on the shaft 41 to thereby hold the bar 58, and therefore the reproducer 10, in the position determined by the weight on the scale-platform without possibility of vibration, which would cause the stylus of the reproducer to injure the record when the latter has been set in motion. In the present case the pawl 64 is disengaged from the ratchet-wheel 63 by means which are somewhat different from the means shown in said Letters Patent No. 702,985 and are better adapted to the changed organization of the machine. The hub of the pawl 64 is provided with a pin or projection 65 in the path of a similar projection 66 on a collar 67, which is secured to the shaft 41, so that when said shaft is rocked in one direction, as hereinbefore described, the pawl will be lifted from the ratchet-wheel to permit the necessary movement of the reproducer; but when the shaft is rocked in the opposite direction to release the record-plate 5 the pawl is permitted again to engage the ratchet and thereafter hold the reproducer from movement.

In the operation of the machine shown in the drawings it will be understood that when a person stands upon the scale-platform the reproducer will thereby be moved with relation to the record to an extent determined by the weight of the person. The handpiece is then depressed to move the gear-segment 18 from its normal position of rest. The gear-segment is released from the lever 21, operated by the handpiece as soon as the latter has completed its movement, but is held from return in response to the tension of the spring 19 through the engagement of the pawl 16 on the pinion 15 with the shaft of the record-plate 5, which is still held by the detent 40. The proper coin being introduced through the coin-slit and falling through the chute strikes the finger 49 and rocks the sleeve 47, thereby disengaging the latch 46 from the notch 45 of the collar 44 and permitting the shaft 41 to be rocked by the spring 42 in a direction to release the record-plate. Just previous to the release of the plate 5 the stop 66 on the collar 67 moves away from the stop 65 on the pawl 64 and permits the latch to engage the ratchet-wheel 63, thereby through the pinion 62 and the rack-teeth 61 holding the bar 58 and the reproducer 10 in the position determined by the weight of the person on the scale-platform. The release of the plate 5 by the detent 40 permits the latter to receive a complete rotation through the return of the segment 18 by the spring 19, and as the rotation of the plate is completed the pick-up 43 again lifts the detent 40 into position to stop the further rotation of the record-plate. The lifting of the detent in this manner rocks the shaft 41 to an extent sufficient to permit the shoulder 45 to be engaged by the detent 46 and at the same time lifts the pawl 64 from the ratchet-wheel 63, again leaving the bar 58 and the reproducer 10 free to be moved at another operation. As the segment 18 returns to its normal position under the influence of the spring 19 its pin 20 acts upon the finger 35 to disengage the latch 29 from the hub 27 of the lever 21, thus permitting the handpiece to rise again to its normal position.

It will be understood that the improvements herein described are not restricted in their application to a machine for announcing weights, but are applicable to other machines of like general character—such, for example, as the height-measuring machine shown in said Letters Patent No. 718,500. It will also be understood that the details of construction and arrangement of the parts can be varied as may be necessary to adapt them to different machines without departing from the spirit of the invention.

I claim as my invention—

1. In a machine of the character described, the combination of a movable record, a reciprocating gear-segment, a device intermediate said gear-segment and record to effect movement of the record in one direction only through the reciprocation of the segment and means for reciprocating said segment, substantially as described.

2. In a machine of the character described, the combination of a movable record, a reciprocating gear-segment, a device intermediate said gear-segment and record to effect the movement of the record in one direction only through the reciprocation of the segment, an operating-lever for said segment and means to disengage said segment from said lever, substantially as described.

3. In a machine of the character described, the combination of a movable record, a gear-segment in operative relation therewith, an operating-lever adapted for engagement with said segment, and means to disengage said segment from said lever, substantially as described.

4. In a machine of the character described, the combination of a movable record, a reciprocating gear-segment in operative relation therewith and having a projecting pin, an operating-lever mounted in proximity to said segment and adapted to engage said pin, and a fixed cam coöperating with said lever to move it out of engagement with said pin, substantially as described.

5. In a machine of the character described, the combination of a movable record, a reciprocating gear-segment in operative relation therewith, an operating-lever adapted for engagement with said segment, means to disengage said lever from said segment, a latch to hold said lever in abnormal position and means to disengage said latch, substantially as described.

6. In a machine of the character described, the combination of a movable record, a reciprocating gear-segment in operative relation therewith, an operating-lever adapted for engagement with said segment, means to disengage said lever from said segment, a latch to hold said lever in abnormal position, and means operated by said segment to disengage said latch, substantially as described.

7. In a machine of the character described, the combination of a movable record, a reciprocating gear-segment having a projecting pin, an operating-lever mounted concentrically with said segment for engagement with said pin and movable laterally from said segment and having a lateral projection, and a fixed cam coöperating with said projection to disengage said lever from said pin, substantially as described.

8. In a machine of the character described, the combination of a movable record, a reciprocating gear-segment, having a projecting pin, an operating-lever adapted for engagement with said pin, a latch adapted to hold said lever in abnormal position, and a finger-piece secured to said latch and arranged to coöperate with said pin to disengage said latch, substantially as described.

9. In a machine of the character described, the combination of a movable record, a reciprocating gear-segment having a projecting pin, an operating-lever mounted concentrically with said gear-segment for engagement with said pin and movable laterally, means to disengage said lever from said pin, a latch to hold said lever in abnormal position and a finger-piece carried with said latch for coöperation with said pin to disengage said latch from said lever, substantially as described.

This specification signed and witnessed this 18th day of August, A. D. 1903.

GEORGE ALBERT MOORE.

In presence of—
JOHN M. SCOBLE,
W. B. GREELEY.